United States Patent [19]

Ricard

[11] 3,723,864

[45] Mar. 27, 1973

[54] METHOD AND APPARATUS FOR DETERMINING THE EXISTENCE OF A DEFECT IN AN ELECTRICAL LINE AND ITS LOCATION

[75] Inventor: Louis Ricard, Villeurbanne, France

[73] Assignee: Compagnie Generale D'Electricite, Paris, France

[22] Filed: Mar. 15, 1971

[21] Appl. No.: 124,151

[30] Foreign Application Priority Data

Mar. 13, 1970 France.................................7009181
Mar. 27, 1970 France.................................7011296

[52] U.S. Cl........................................324/52, 317/36 D
[51] Int. Cl. ................................................G01r 31/08
[58] Field of Search ......................324/52, 51; 317/36

[56] References Cited

UNITED STATES PATENTS 3,369,156   2/1968   Souillard............................317/36 D
3,413,523   11/1968  Hoel..............................317/36 D X
3,475,655   10/1969  Suzuki............................317/36 D X
3,612,989   10/1971  Souillard..............................324/52

*Primary Examiner*—Gerard R. Strecker
*Attorney*—Sughrue, Rothwell, Mion, Zinn & Macpeak

[57] ABSTRACT

The surveillance device according to the invention determines a resistance $R_d$ of a defect and its distance x from a measurement point and relates them to a pre-established surveillance contour. Analog memories, containing the analog input signals, are — by means of converters — connected to digital memories which themselves are connected, by means of a set of switches, to a calculation means which makes simple calculations and comparisons. The speed of execution permits the surveillance — during an interval of time less than one quarter of a period — of the large number of lines issuing from one station.

6 Claims, 15 Drawing Figures

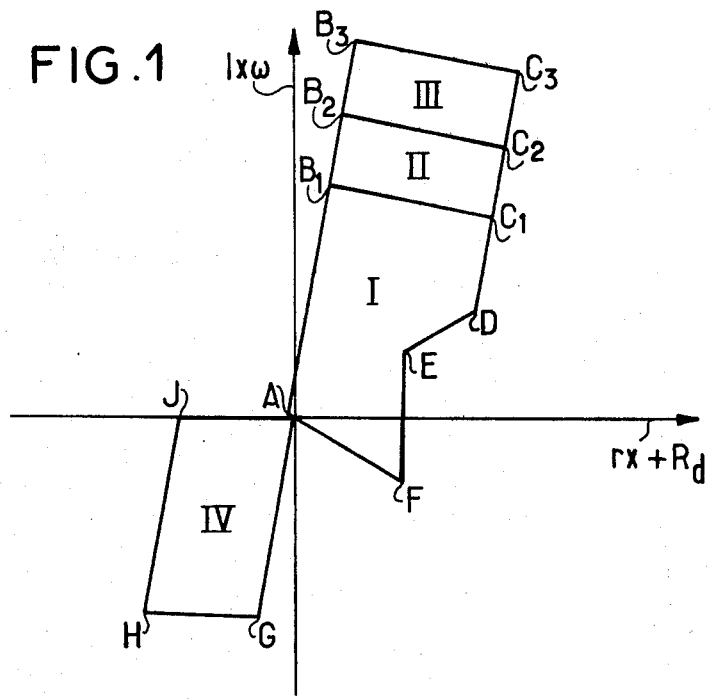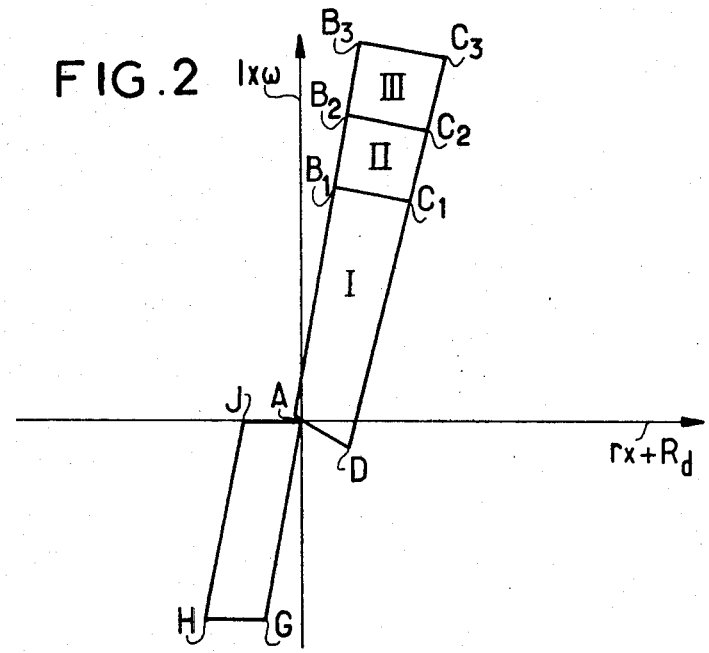

METHOD AND APPARATUS FOR DETERMINING THE EXISTENCE OF A DEFECT IN AN ELECTRICAL LINE AND ITS LOCATION

SUMMARY OF THE INVENTION

This invention relates to a method and device for the surveillance of several electrical lines, including the evaluation — on the basis of the instantaneous values of the voltage $u$ and the current $i$ in a phase-ground or phase-phase loop — of the resistance $Rd$ of a possible defect in the loop under consideration and, second, the distance $x$ between the measurement point and said defect.

Devices are known that perform analog computations on the basis of the value of the voltage $u$ and the current $i$ in a line, by resolving the equation:

$$u = (rx + Rd)i = (lx)(di/dt)$$

which represents a line which includes a defect with value $Rd$ situated at a distance $x$.

The computation times are relatively long and such devices can be very cumbersome.

Knowing the characteristics of the line, that is:

$r$ which is its resistance per unit length; and $l$ which is its inductance per unit length, as well as the limits of the measurement apparatuses, the accuracy of the formula in which we neglect the capacity whose disturbing effect is a growing function of the length of the line, on the one hand, and, on the other hand, of the value of the resistance $Rd$ and the requirements of the user, that is, the operator of the electric power transmission and distribution lines, it is possible to determine a curve called the "surveillance contour". This curve is produced by plotting, on the abscissa, the active value of the impedance, that is, $rx + Rd$, and, on the ordinate its reactive value, that is, $lx\omega$ ($\omega$ = rate of change of current). This surveillance contour is shown in FIG. 1 in the attached drawings, for a phase-ground loop and in FIG. 2 for a phase-phase loop.

If, on the abscissa, we plot the value of the defect $Rd$, we get a much simpler form of surveillance contour. Such a contour is shown in FIG. 3 for a phase-ground loop and in FIG. 4 for a phase-phase loop. One can even reduce these contours so as to have only the horizontal and vertical segments, as shown in FIG. 5, by replacing the oblique lines with successions of straight lines.

These considerations enable us to spell out the purpose of this invention which is to detect the presence or absence of a defect on the basis of the measurement $Rd$ which signifies possible defect, before undertaking the computation of the location of this defect, said computation being performed only after it is determined that the possibility of there being no defect does not exist. No defect is said to exist if the value of $Rd$ is between two predetermined limits. The value $Rd$ of the defect is derived from the values of the voltage $u$, the current $i$, and its derivative $di/dt$, for the phase-ground or phase-phase loop considered, taken at two instants $t1$ and $t2$. $Rd$ and $x$ are derived using the following equations:

$$u1 = (ri1 + 1\,[di1/dt])x + Rd\,i1$$

$$u2 = (ri2 + 1\,[di2/dt])x + Rd\,i2$$

from which we get:

$$Rd = \frac{\left(ri1 + 1\frac{di1}{dt}\right)u2 - u1\left(ri2 + 1\frac{di2}{dt}\right)}{i2\left(ri1 + 1\frac{di1}{dt}\right) - i1\left(ri2 + 1\frac{di2}{dt}\right)} \quad (1)$$

and:

$$x = \frac{i1u2 - i2u1}{i2\left(ri1 + 1\frac{di1}{dt}\right) - i1\left(ri2 + 1\frac{di2}{dt}\right)} \quad (2)$$

The form of the surveillance contours in FIGS. 3, 4 and 5 enables us to define two values of $Rd$ on either side of which no defect is possible, hence, it is not necessary to calculate $x$. For values of $Rd$ corresponding to a possible defect, we calculate $x$ and verify whether the point defined by $Rd$ and $x$ is inside the surveillance contour in order to determine if there is indeed a defect whose resistance is $Rd$ and which is situated at a distance $x$ from the measuring point.

The method according to the invention is characterized by the fact that we compare said value $Rd$ to two pre-determined values and then:

if the value of $Rd$ is outside of a range bounded by these two predetermined values, we go on to the next loop, if the value of $Rd$ is between these two predetermined values, we perform a series of comparisons of $Rd$ and $x$ with the other predetermined values, enabling us to eliminate cases of incompatibility between the values of $Rd$ and $x$. If there is an incompatibility we go on to the surveillance of the following loop. In other cases a defect signal is triggered.

The device according to the invention, which employs said process, is characterized by the fact that it includes:

a means called an input means, including an analog means for producing a signal that is representative of the voltage drop per unit of length inherent in the line, switching means for sequentially scanning the phase-ground and phase-phase loops made up of said electrical lines, and analog-digital converters which transform said analog signals into digital data, and a means, called a computation means, including a first digital computation circuit for determining the value $Rd$ of the resistance of a possible defect, a comparison circuit for comparing said value with respect to two limit values and acting either upon said means for assuring switching so as to pass on to a new measurement, or upon a second computation circuit that evaluates the value $x$, the distance between the measurement point and the defect, a plurality of logic and comparison circuits, making it possible to locate said values $Rd$ and $x$ with respect to a surveillance contour defined by a given function of these two values, and acting either upon said means for assuring switching so as to pass on to a new measurement upon another loop when said values $Rd$ and $x$ are outside said surveillance contour, or upon intervention means which take into consideration the existence of a defect with resistance $Rd$, situated at distance $x$, when said values $Rd$ and $X$ are inside said surveillance contour.

According to one preferential form of implementing the invention, said input means includes:

a plurality of analog voltage detectors and a plurality of analog current detectors, associated with each of said electrical lines, a plurality of analog circuits connected at the input to said analog current detectors and furnishing, at their outputs, a signal representative of the voltage drop per unit of length in the corresponding electrical line, due to its own impedance, a plurality of analog memories each connected, by means of a plurality of switches controlled in synchronism, to the output of a voltage detector, a current detector, or one of said analog circuits, at least two groups of principal digital memories, said analog-digital converters each connecting, on the one hand, by means of one of said analog memories and on the other hand by means of one of said principal digital memories of one of the same group, by means of controlled switches, the switches of one and the same memory group being controlled simultaneously and those of two different groups and two different instants, and at least two groups of auxiliary digital memories connected, respectively, to said principal digital memories by means of controlled switches, those corresponding to one and the same electrical line being controlled simultaneously, and the output of each auxiliary digital memory being linked to an input of said computation member by means of a switch.

Furthermore, subtracting digital circuits are placed, each, between an auxiliary memory, connected to their output, and two principal digital memories, corresponding to two phases of a multiphase electrical line, connected to their inputs by means of controlled switches.

According to another preferred form of implementing this invention, said controlled switches include field effect transistors.

Finally, said intervention means works out triggering orders and includes:

a plurality of binary memories, each corresponding to a phase-ground or phase-phase loop determined by said electrical lines and to a zone relative to a section of these lines, each activated when a defect has been detected by said computation means in the zone and in the loop to which they correspond, circuits for working out single-phase triggering orders, each activated, on one hand, directly by that binary memory which corresponds to a first zone and to the phase considered, and, on the other hand, through the delay circuits, by means of the binary memory which corresponds to the same phase and to other zones, and circuits for working out multiphase triggering orders, each activated, on the one hand, directly, by the binary memory which corresponds to a first zone and to a defect between two phases, and, on the other hand, through delay circuits, by means of the binary memory which corresponds to a defect between two phases and in other zones, said delay circuits each involve logic gates associated with a binary counter controlled by a clock, the capacity of the counter being a function of the delay value to be introduced.

BRIEF DESCRIPTION OF THE DRAWINGS

Other features of this invention will appear as we study the example of a surveillance device and its implementation, given here without any limitations, by referring to the attached drawing where:

FIGS. 1 and 2 define the surveillance contours, respectively, for a phase-ground loop and for a phase-phase loop.

DETAILED DESCRIPTION OF THE PREFERRED EMBODIMENTS

The surveillance contours shown in FIGS. 1 and 2 are obtained from the basic equation:

$$u = (rx + Rd)\, i + (lx)[di/dt]$$

by plotting, on the abscissa, the active value $(rx + Rd)$ of the impedance of the phase-ground or phase-phase loop considered and, on the ordinate, its reactive value $(lx)$. The line AB1 B2 B3 shows the inherent impedance of the loop assumed to be short-circuited at distance $x$; the lines AF, FE, ED and DC1 C2 C3 are defined by the loop utilization conditions (values of cos, maximum current . . . ) and the characteristics of the apparatuses and especially the network operating conditions.

If we write the basic equation in the following form:

$$u = (ri + l\,[di/dt])\, x + Rd\, i$$

the term $(ri + l\,[di/dt])$ is an inherent characteristic of the line which represents the instantaneous voltage drop per unit of length, the term $Rd$ representing the defect. The surveillance contours in FIGS. 1 and 2 are simplified in FIGS. 3 and 4 by showing $Rd$ on the abscissa and $lx$ (or $x$) on the ordinate.

Figure 3:
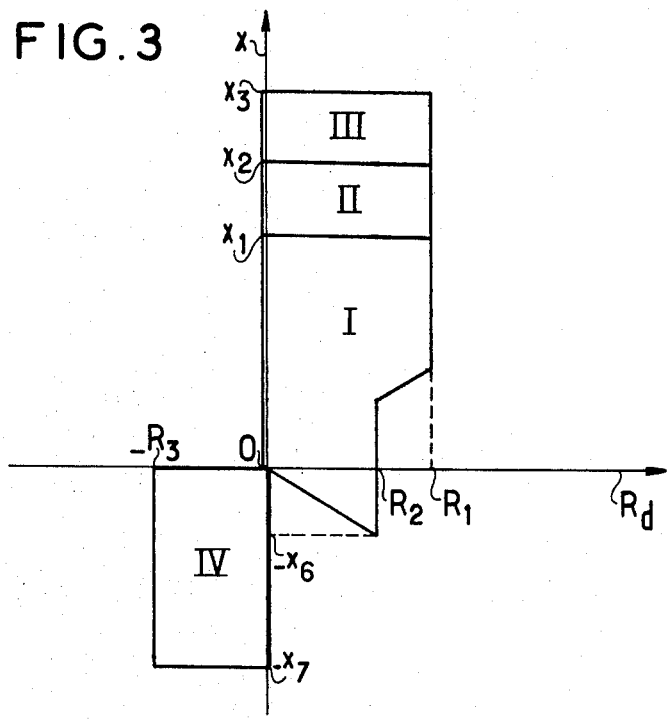
FIGS. 3 and 4 illustrate simplified surveillance contours.
Figure 5:
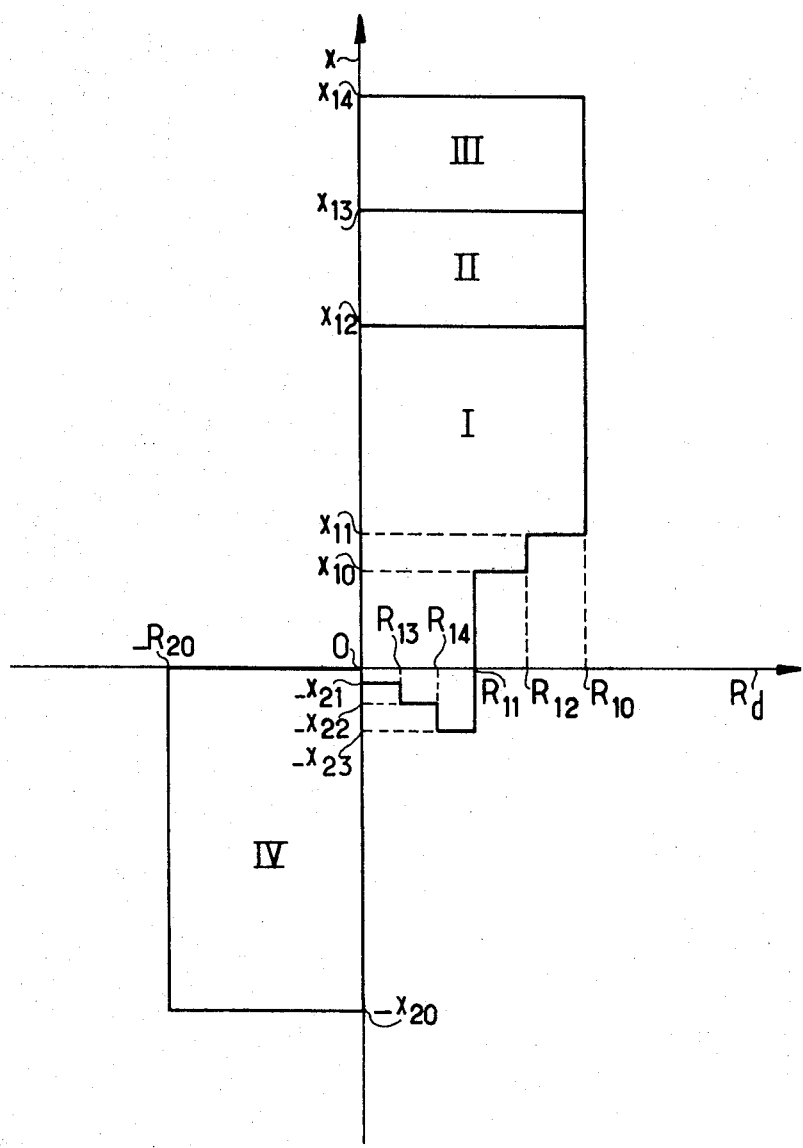
FIG. 5 illustrates an improved contour derived from the one in FIG. 3.

The surveillance contour shown in FIG. 5 is derived from the one in FIG. 3 to the extent that the oblique lines are replaced by successions of straight lines, for reducing to a minimum the comparison time by using circuits that are as simple as possible.

The interior of each of the surveillance contours of FIGS. 1–5 is divided into four sectors. Sector I shows a first portion of the loop situated immediately downstream from the measurement point. Sector II shows a second portion of the loop situated downstream from the measurement point and after the one shown by Sector I. Likewise, the portion represented by Sector III is downstream from the one shown by Sector II. Other measurement points will be arranged between each of the portions of the loop thus defined. Sector IV corresponds to a loop portion immediately upstream from the measurement point considered.

Such a cutoff is not critical and one could confine oneself to Sector I. However, it does introduce added security by virtue of the fact that Sector II doubles the effect of Sector I on the point immediately downstream from the one considered, while Sector III covers a more distant upstream portion of the loop and Sector IV doubles Sector I at the point position immediately upstream.

The action of Sector I will be instantaneous, that of Sectors II and IV will be slightly delayed and that of Sector III will be more delayed so that the determination of $x$ and the intervention as such will preferably occur at a point in Sector I.

Figure 4:
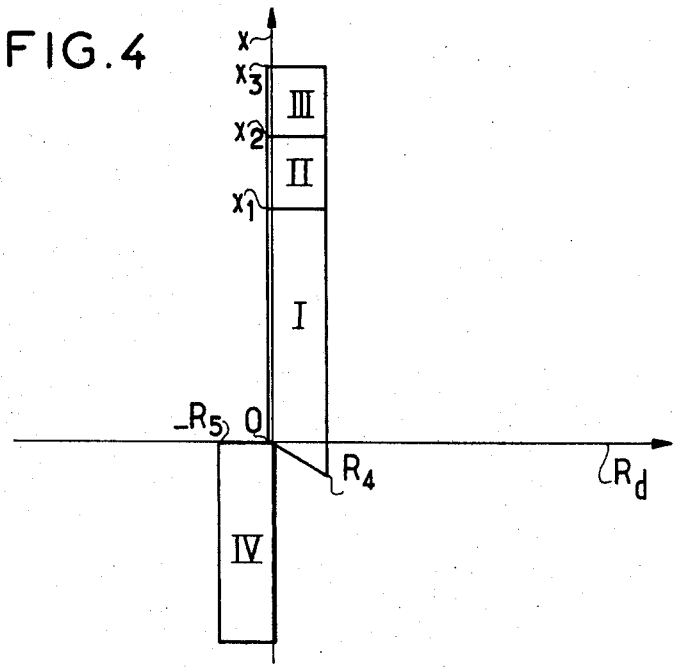

The surveillance principle is very simply derived from the study of the surveillance contours of FIGS. 3, 4 and 5. Any value of $Rd$, determined on the basis of $u$ and $i$ and according to equation (1), is compared to the values R10 and R20. There is the possibility of a defect only if $Rd$ is included between these two values. In this case, the value of $x$ is calculated according to equation (2). If $Rd$ is not included between these two values, $x$ is not calculated and we go on to another check for example, on another loop.

Figure 6:
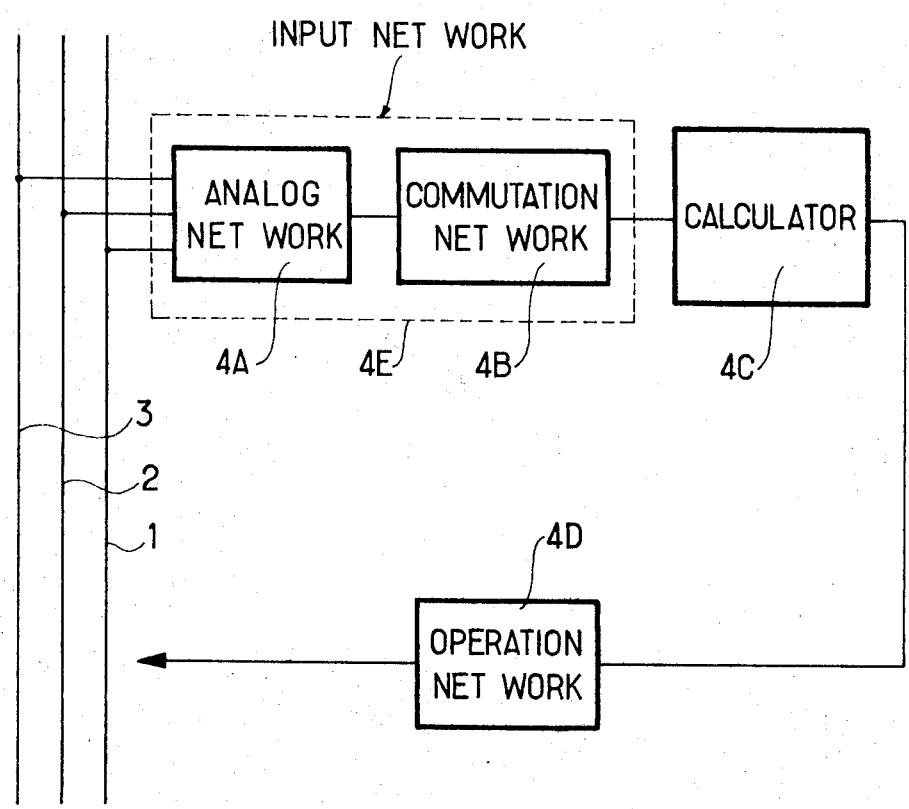
FIG. 6 shows a synoptic diagram of the device according to the invention.

FIG. 6 shows a synoptic diagram of the device according to the invention. The three phases, $a$, $b$, $c$ of a three-phase line are connected to a measurement block 4A which works out the analog magnitudes of the line magnitudes. Block 4A is connected to block 4B, selecting a group of said analog magnitudes which are representative of a given loop, to the computation means 4C. 4A and 4B constitute the input member 4E. 4D represents the intervention means which acts on the line, for example, to trigger the opening of the line. The description will successively cover the explanation of each of the blocks 4A, 4B, 4C and 4D.

Figure 7:
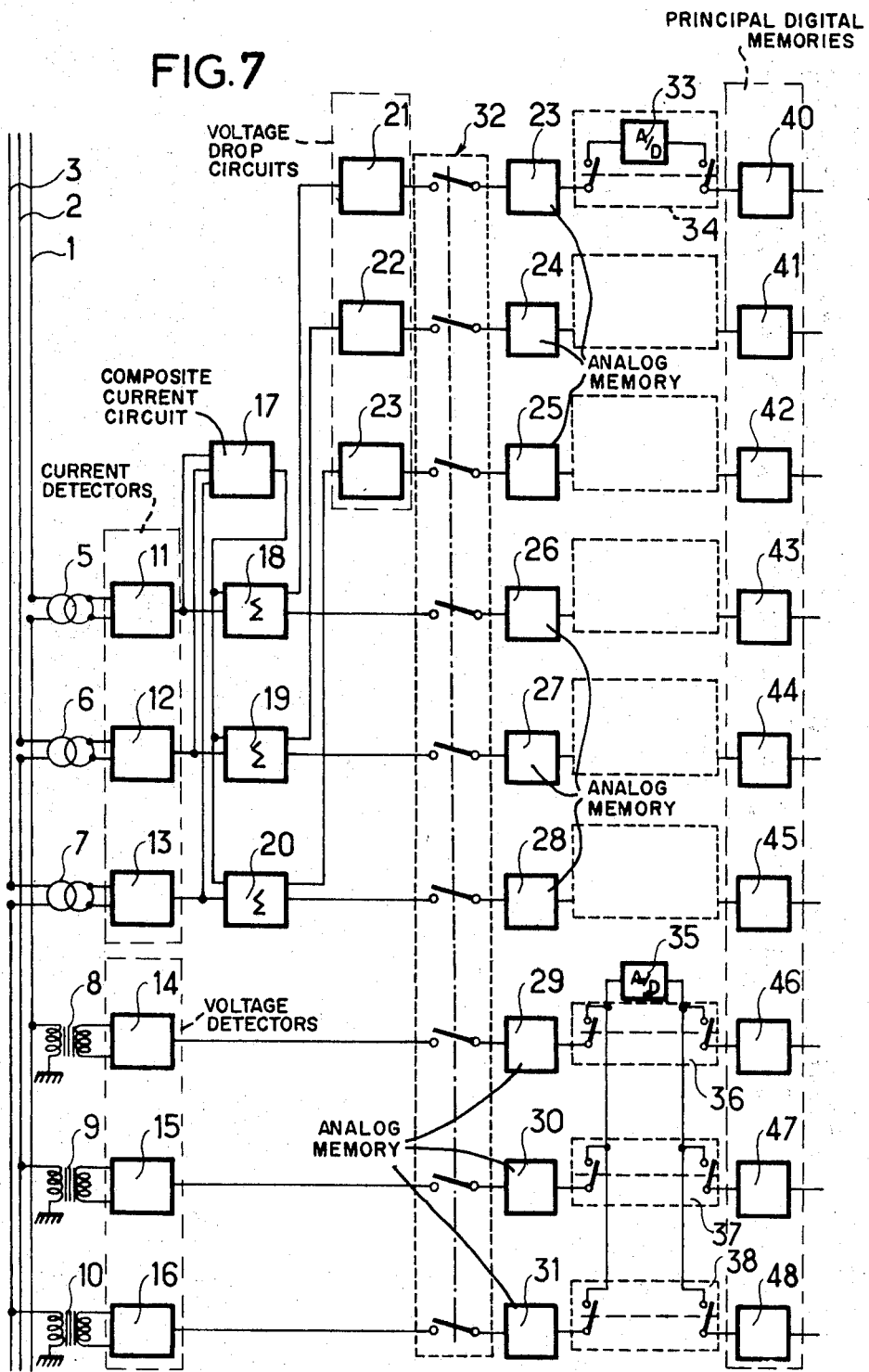
FIG. 7 is a schematic representation of the interconnection of the voltage and current detectors on a three-phase lead-out and of the principal memories that receive the data delivered by these detectors and adapted with the help of analog amplifiers.

FIG. 7 shows the input elements for a three-phase line (block 4E, FIG. 6). Each phase $a$, $b$, and $c$ is equipped with a current transformer 5, 6, and 7 and with a voltage transformer 8, 9, and 10. The analog detectors 11, 12, 13, 14, 15 and 16 are connected, respectively, to the current and voltage transformers and furnish analog signals that are representative of the currents $ia$, $ib$, $ic$, and of the voltages $va$, $vb$, $vc$, of each phase.

Circuit 17 produces a signal $k_o i_o$ which is proportional to the homopolar current $i_o$ in response to the signals from circuits 11, 12, 13. The summation circuits 18, 19, 20, associated with circuit 17 and, respectively, with circuits 11, 12, 13, generate signals that are representative, respectively, of $ia + k_o i_o$, $ib + k_o i_o$ and $ic + k_o i_o$, which we will call, respectively, $Ia$, $Ib$, and $Ic$. The derivative and summation circuits 21, 22, 23, responsive to the signals from circuits 18, 19, 20, produce signals each of which is representative of the voltage drop per unit of length in a line, that is to say:

$$r(i + k_o i_o) + l(d/dt)(i + k_o i_o)$$

where $r$ is the resistance per unit of length,
$l$ is the inductance per unit of length,
$k_o$ is the homopolar impedance coefficient,
$i_o$ is the homopolar current,
and where $i$ takes the value $ia$, $ib$, or $ic$ of the current in the phase considered. For simplification, we will call $zIa$, $zIb$, and $zIc$ these voltage drops per unit of length.

The values $Va$, $Vb$, $Vc$, $Ia$, $Ib$, $Ic$, and $zIa$, $zIb$, $zIc$ make it possible to detect and locate a defect. These values are placed — at a rigorously common instant $t1$ — in analog memories 23–31 by means of a multiple switch 32. This switch is closed for an extremely brief and perfectly synchronized time.

In order to be used by the computation and comparison means, described in greater detail below, these analog values are transformed into digital values. For this purpose, an analog-digital converter 33 is placed between each analog memory, such as 23, and a digital memory, such as 40. A double switch 34 provides for the rapid and simultaneous connection of the converter with each one of the two memories in order to permit, on the one hand, the conversion of the analog magnitude into binary information, and, on the other hand, to make it possible to store this information in the binary memory.

It is possible to reduce the number of analog-digital converters by associating a converter, such as 35, successively with several analog memories, such as 29, 30, 31, and as many digital memories, such as 46, 47, 48, the connections being made by double switches such as 36, 37, 38. These switches are controlled successively and the closing time of each is sufficient to permit the transformation of analog signals into digital signals and their transfer.

The values corresponding to the time $t1$, contained in the analog memories 23–31, are therefore found in the digital memories 40–48.

When a defect is detected, on the one hand, for a phase-ground loop, it is magnitudes relative to the phase considered which must be used. On the other hand, for a phase-phase loop, it is necessary to determine the magnitudes relative to the two phases considered.

Moreover, we must have two groups of values at two different instants $t1$ and $t2$. For that purpose, a second bloc of principal memories (not shown) is mounted, in parallel, with the bloc of memories 40–48. These memories receive the values obtained at an instant $t2$ which is different from instant $t1$. One can also provide a third bloc of memories so that another group of values, taken at an instant $t3$, will make it possible to check out the competition. In this latter case, the means which works out the triggering orders, described below, will be activated only if there is agreement between the result obtained on the basis of the values at instants $t1$ and $t2$ and the one obtained on the basis of the values at instants $t2$ and $t3$.

Figure 8:
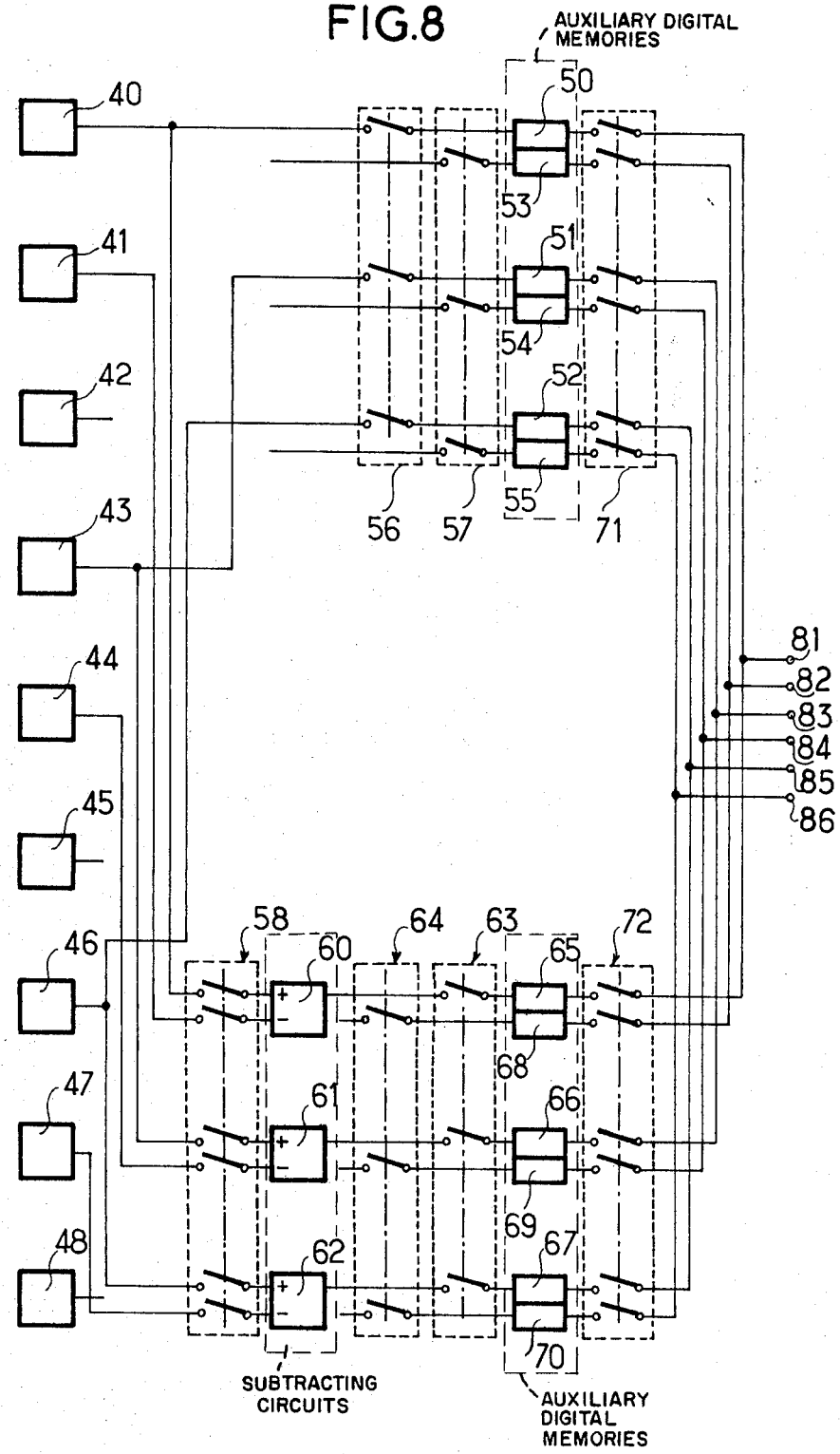
FIG. 8 is a schematic illustration of the connection of the principal memories to the auxiliary memories of the computation block.

In FIG. 8, the auxiliary digital memories 50, 51, 52 receive — through a triple switch 56 — the magnitudes contained in the principal digital memories 40, 43, 46 and relative to phase 1 and to an instant $t1$. Simultaneously, the auxiliary memories 53, 54, 55 receive — through a triple switch 57 — the magnitudes relative to phase 1 and to an instant $t2$, and contained in another block of principal memories.

Subtracting circuits 60, 61, 62 receive the magnitudes relative to the two phases 1 and 2 and contained in the principal memories 40, 43, 46 and 41, 44, 47, thus obtaining the compound magnitudes $V1-V2$; $I1-I2$ and $zI1-zI2$ which permit the surveillance of the phase 1-phase 2 loop.

The compound magnitudes obtained on the basis of the magnitudes contained in the memory block corresponding to the instant $t1$ are placed in the auxiliary memories 65, 66, 67 by means of a triple switch 63. Likewise, the magnitudes corresponding to instant $t2$ lead to compound values which are likewise placed in the memories 68, 69, 70 by means of a triple switch 64. For this purpose we can use — in two successive operations — the subtractors 60, 61, 62, or we can provide other subtractors.

The six signals 81, 82, 83, 84, 85, and 86, which are necessary for the surveillance of the loop, are transmitted to the computation means which is extensively described below in the description, in the reference to FIGS. 10-14. The values of these six signals are taken either from the auxiliary memories 50-55 by means of a switch 71, or from the auxiliary memories 65-70 by means of a switch 72.

This enables us simultaneously to handle the placement of a group in the memory, while the other group is used in the calculation. Thus, for example, when memories 50-55 contain the values relative to phase 1, the computation member performs the surveillance of this phase. Simultaneously, memories 65-70 receive the values relative to the phase 1-phase 2-loop; then, surveillance will be carried out on the phase 1-phase 2 loop, while memories 50-55 will receive new values relative to phase 2; and so forth and so on.

Figure 9:
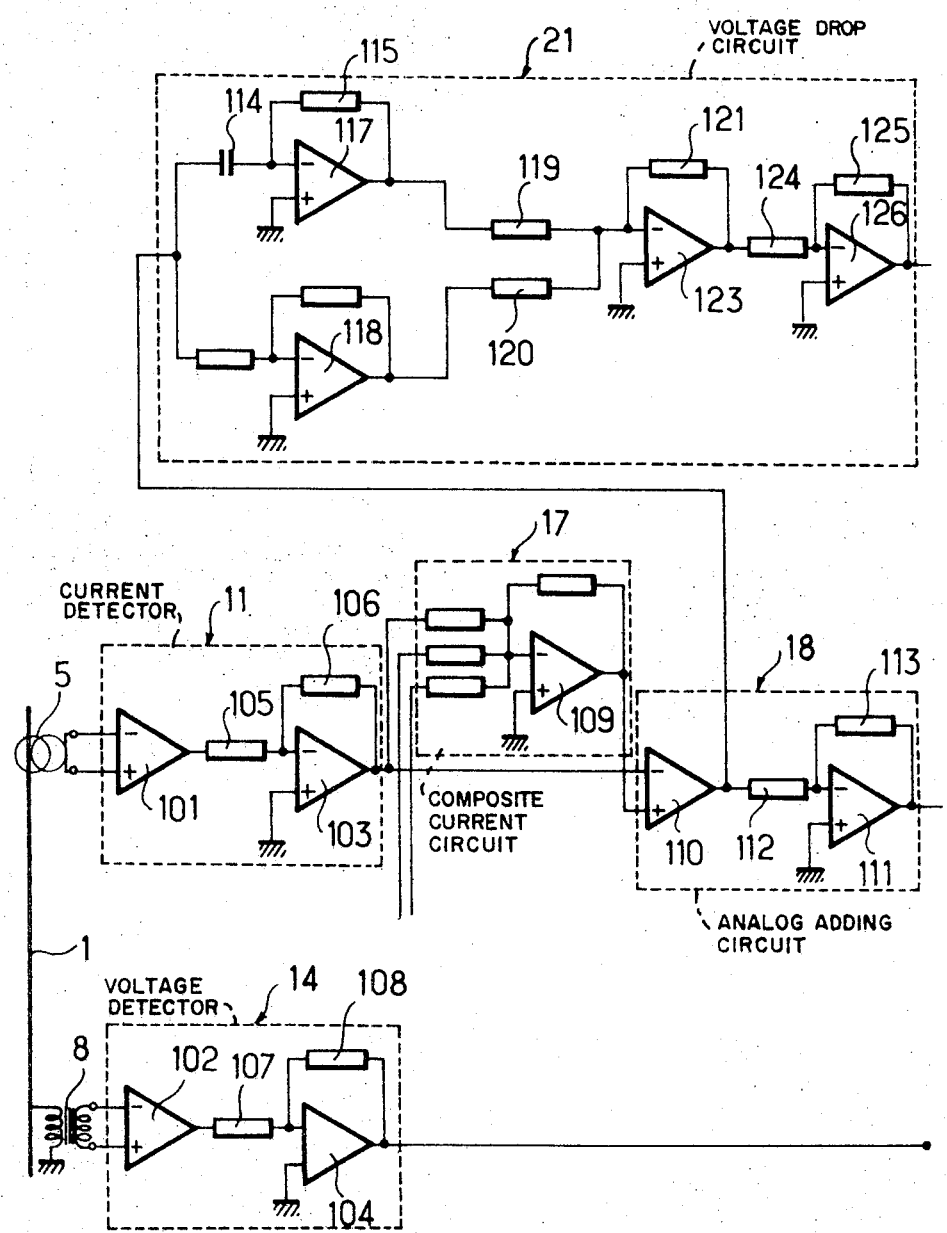
FIG. 9 is a more detailed illustration of the detectors and the analog circuits in FIG. 7.

The analog elements shown schematically in FIG. 7a are advantageously made from operational amplifiers, as indicated in FIG. 9.

The operational amplifiers 101 and 102 are used in a differential configuration so as to eliminate the bad effect of voltages having a common mode. They are connected, respectively, to the current transformer 5 and to the voltage transformer 8.

Operational amplifiers 103 and 104, associated with the resistance-capacitance networks represented by 105, 106 and 107, 108, are used as active filters. Their purpose is to eliminate the high-frequency deformations, progressive waves, and others which spring up primarily at the moment of the appearance of defects which create a modification in the network.

The active filters, constituted by amplifiers such as 102, are identical for the three phases. The same goes for those, such as amplifier 104, where the cutoff frequency of the former is higher than that of the latter.

The operational amplifier 109 is used as a summation device and makes it possible — on the basis of currents $ia, ib, ic$ — to obtain the value $-k_o i_o$.

Operational amplifier 110 is used as a differential amplifier with a gain $-1$, and enables us to obtain, on the basis of $ia$ and $-k_o i_o$, the value $-(ia + k_o i_o)$.

Operational amplifier 111, associated with RC networks 112 and 113, constitutes an active filter similar to those mentioned earlier. However, the phase shifts introduced by these filters on signals $Va, Vb, Vc, ia, ib$, $ic$ must be absolutely identical if we do not want to get caught in a computation error.

Voltage drop circuit 21, constituted by operational amplifiers 117, 118, 123, and 126, have the purpose of providing a voltage that will be the image of the voltage drop in the line per unit of length. For this purpose it involves the following:

a derivative circuit made up of an operational amplifier 117 and a RC network comprised of a resistance 115 and a capacitance 114; it delivers a signal with value $-RC (d/dt)(ia + k_o i_o)$, an inverter amplifier with a gain of 1, consisting of an operational amplifier 118, a summation amplifier, consisting of operational amplifier 123, associated with resistances 119, 120, 121, of values R2, R3 and R4, with R4/R3 assumed to be proportional to $r$ and RC. R4/R2 assumed to be proportional to $l$, $r$ and $l$ being the resistance and the inductance per unit of length of the line considered.

Operational amplifier 126, associated with networks 124 and 125, constitutes an active filter identical to the preceding ones.

This assembly, likewise has the purpose of accomplishing the adaptation of the level between the detectors and the digital analog converters.

FIGS. 10-14 describe the computation means which is connected to the selecting bloc 4B.

Figure 10:
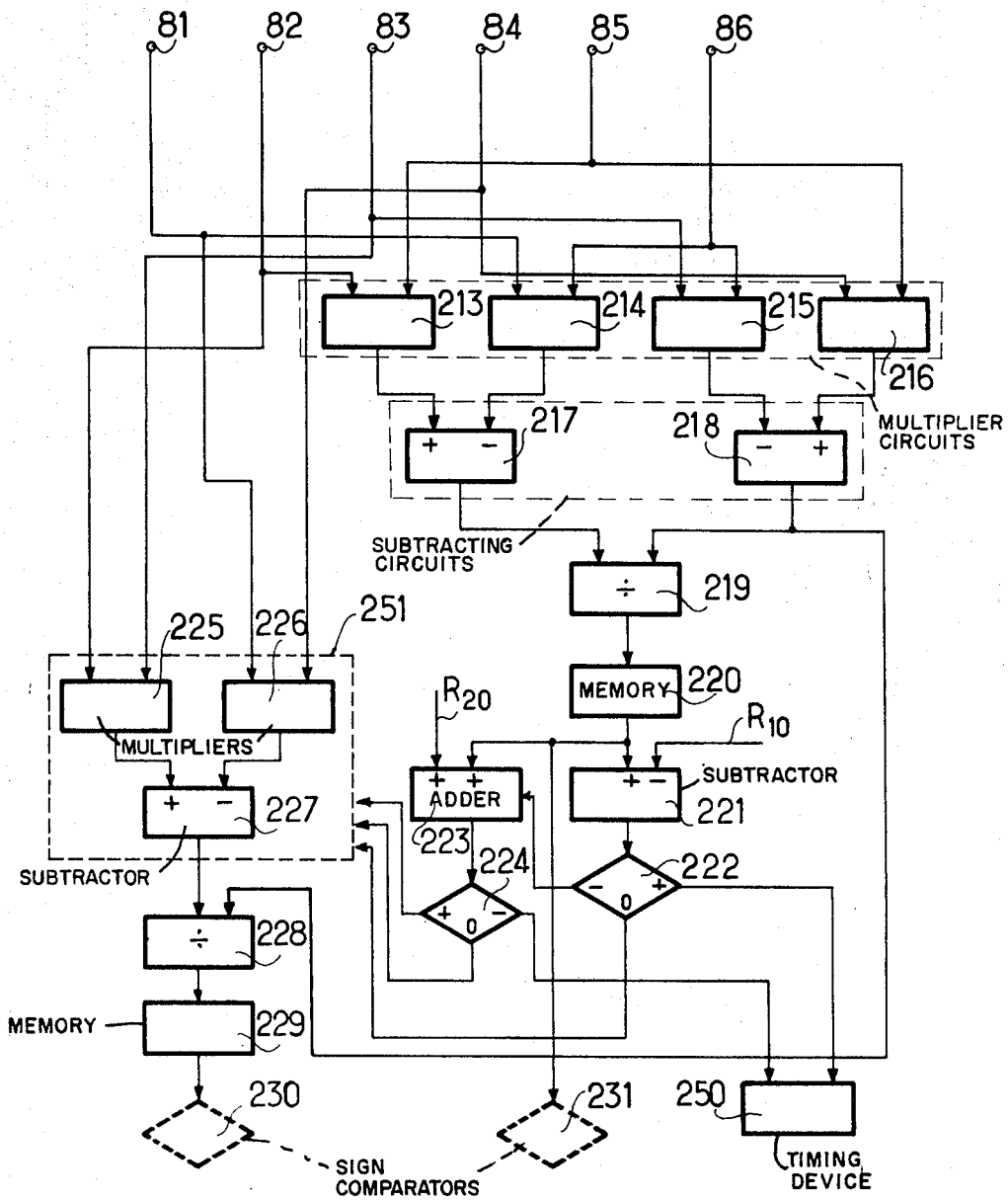
FIGS. 10–14 show, in the form of a block diagram, the computation means.
Figure 11:
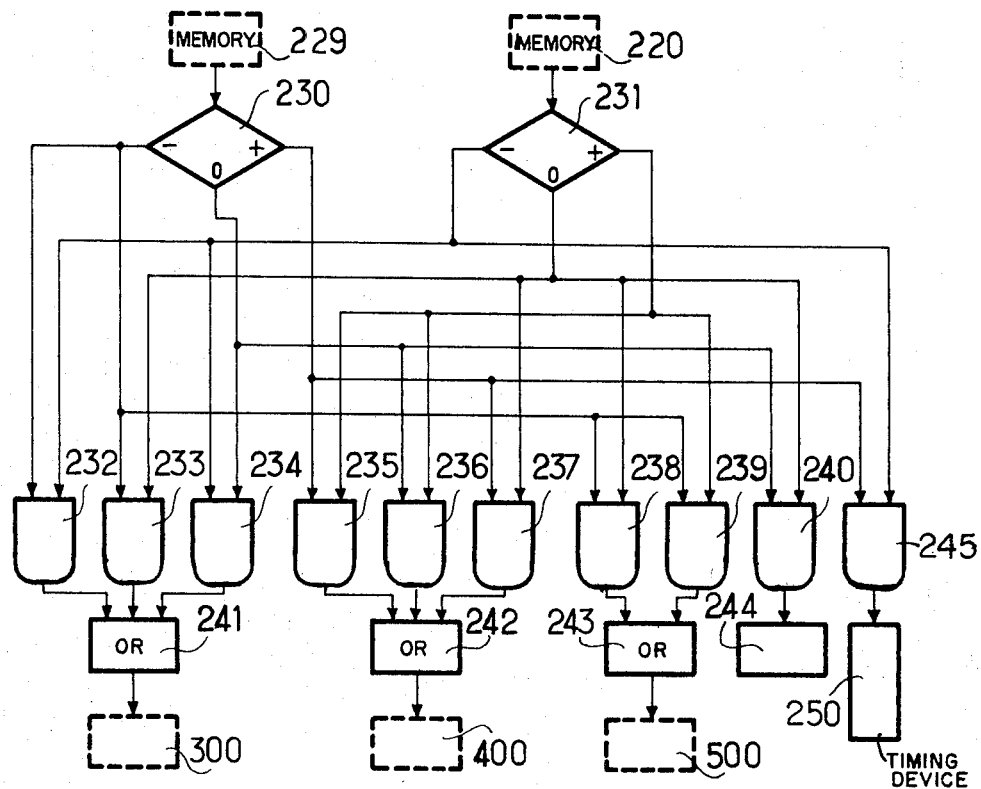

Signals present at the inputs 81-86 of the computation means described in FIG. 10, are representative of the voltage, the current $i_1$, $i_2$ and the voltage drop per unit length $(ri_1 + 1 di_1)/dt$, $(ri_2 + 1 di_2)/dt$ at two instants $t_1, t_2$ of the loop selected by the selecting block 4B. The multiplier circuits 213 and 214 give, respectively, the products $u2 (ri1 + 1 [di1/dt])$ and $u1 (ri2 + 1 [di2/dt])$. The subtractor circuit 217 performs $u2 (ri1 + 1 [di1/dt]) - u1 (ri2 + 1 [di2/dt])$.

The multiplier circuits 215 and 216 give us the products $i1 (ri2 + 1 [di2/dt])$ and $i2 (ri1 + 1 [di1/dt])$. Subtractor circuit 218 performs $i2 (ri1 + 1 [di1/dt]) - i1 (ri2 + 1 [di2/dt])$. Divider circuit 219 gives us the quotient of the signals delivered by the subtractors 217 and 218. The signal $Rd$ obtained here represents the resistance of the defect or the load resistance of the loop depending upon whether or not there is a defect. This signal $Rd$ is stored in a memory 220.

With the help of the subtractor 221, which receives constant information R10 defined on a diagram in FIG. 5, we now perform $Rd - R10$. The comparator circuit 222 enables use to know the value of $Rd$ with respect to R10.

Let us assume $Rd - R10 > 0$, that is to say, $Rd > R10$. This means that there is no defect and the device goes on to measuring another loop by activating a timing device 250 which operates the selecting block 4B.

Let $Rd - R10 = 0$, that is to say, $Rd = R10$. This means that we must calculate the distance x by activating the computation circuit 251.

Let $Rd - R10 < 0$, that is to say, $Rd < R10$. This means that we must compare $Rd$ to $-R20$, defined on the diagram in FIG. 5. The addition circuit 223 gives us the sum $Rd + R20$ which is equivalent to $Rd - (-R20)$. The comparison circuit 224 positions Rd with respect to $-R20$:

If $Rd + R20 < 0$, that is to say, $Rd < -R20$, there is no defect, and we go on to measuring another loop by triggering the timing device 250.

If $Rd + R20 \geq 0$, that is to say, $Rd \geq -R20$, we calculate $x$ by activating the computation circuit 251.

The computation circuit 251 determines the value $x$ when it has been activated and for its input it has the signals present 81, 82, 83 and 84.

The multiplier circuits 225 and 226 gives us the products $u2i1$ and $u1i2$. The subtractor circuit 222 makes it possible to obtain $u2i1 - u1i2$. The divider circuit 228 gives us the quotient of the signals delivered by the circuits 227 and 218, that is: $u2i1 - u1i2$ and $i2 (ri1 + 1 [di1/dt]) - i1 (ri2 + 1 [di2/dt])$. This quotient is the value $x$ which we are looking for. The value is stored in memory 229.

We note, however, that the computation of $x$ by the means of a multiplexing circuit can be accomplished by means of elements 213, 214, 217 and 219.

After a first selection, performed as a function of the value of $Rd$, as indicated above, we must pursue the analysis of the results as a function, this time, of $Rd$ and of $x$, in order to determine whether or not there is a defect. This analysis is made by positioning the coordinates $(Rd, x)$ in the plane of the surveillance contour defined in FIG. 5. First, we must try to find in which quadrant of the plane we find the point $(Rd, x)$, we do this as follows with reference to the diagram in FIG. 11.

The circuit involves two comparison circuits 230 and 231 which determine the signs of $x$ and $Rd$. The various AND circuits 232–240 control the simultaneity of the various signs $Rd$ and $x$.

a1. The AND circuits 232, 233 and 234 furnish an output signal, respectively, if:

$Rd < 0$ and $x < 0$ $Rd = 0$ and $x < 0$ $Rd < 0$ and $x = 0$

Figure 12:
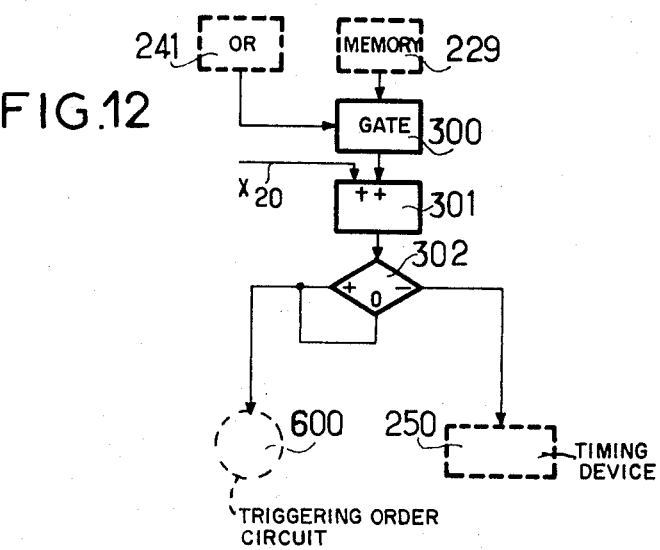
Figure 13:
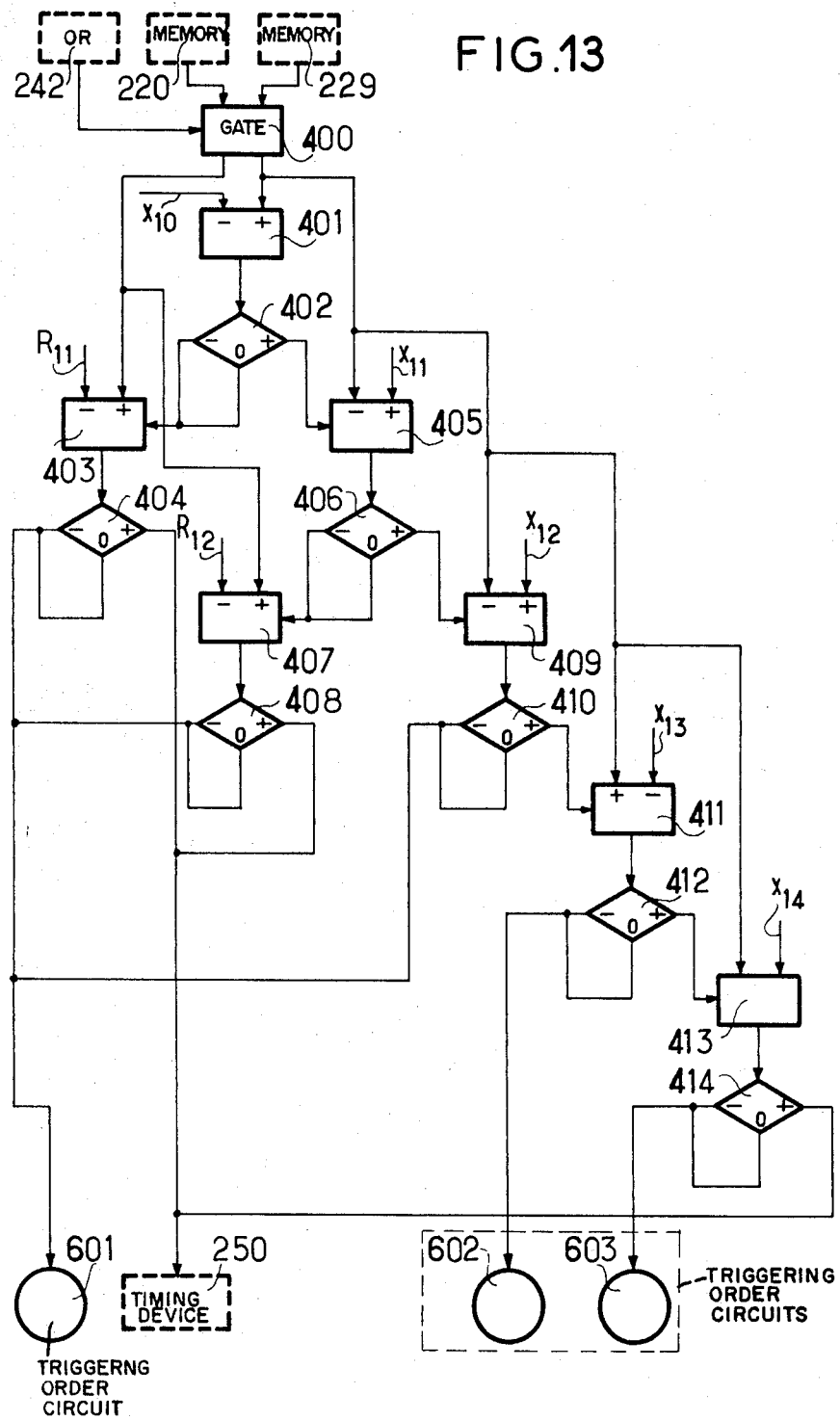

These circuits are associated with OR circuit 241, which authorizes the verification sequence relative to a possible upstream defect shown in FIG. 12.

a2. AND circuits 235, 236 and 237 furnish an output signal, respectively, if:

$Rd > 0$ and $x > 0$ $Rd > 0$ and $x = 0$ $Rd = 0$ and $x > 0$ they are associated with the OR circuit 242 which authorizes the verification sequence relative to a downstream defect that is possible in zones I, II, III of FIG. 5, shown in FIG. 13.

a3. The AND circuits 238 and 239 furnish an output signal, respectively, if:

$Rd = 0$ and $x < 0$ $Rd > 0$ and $x < 0$

Figure 14:
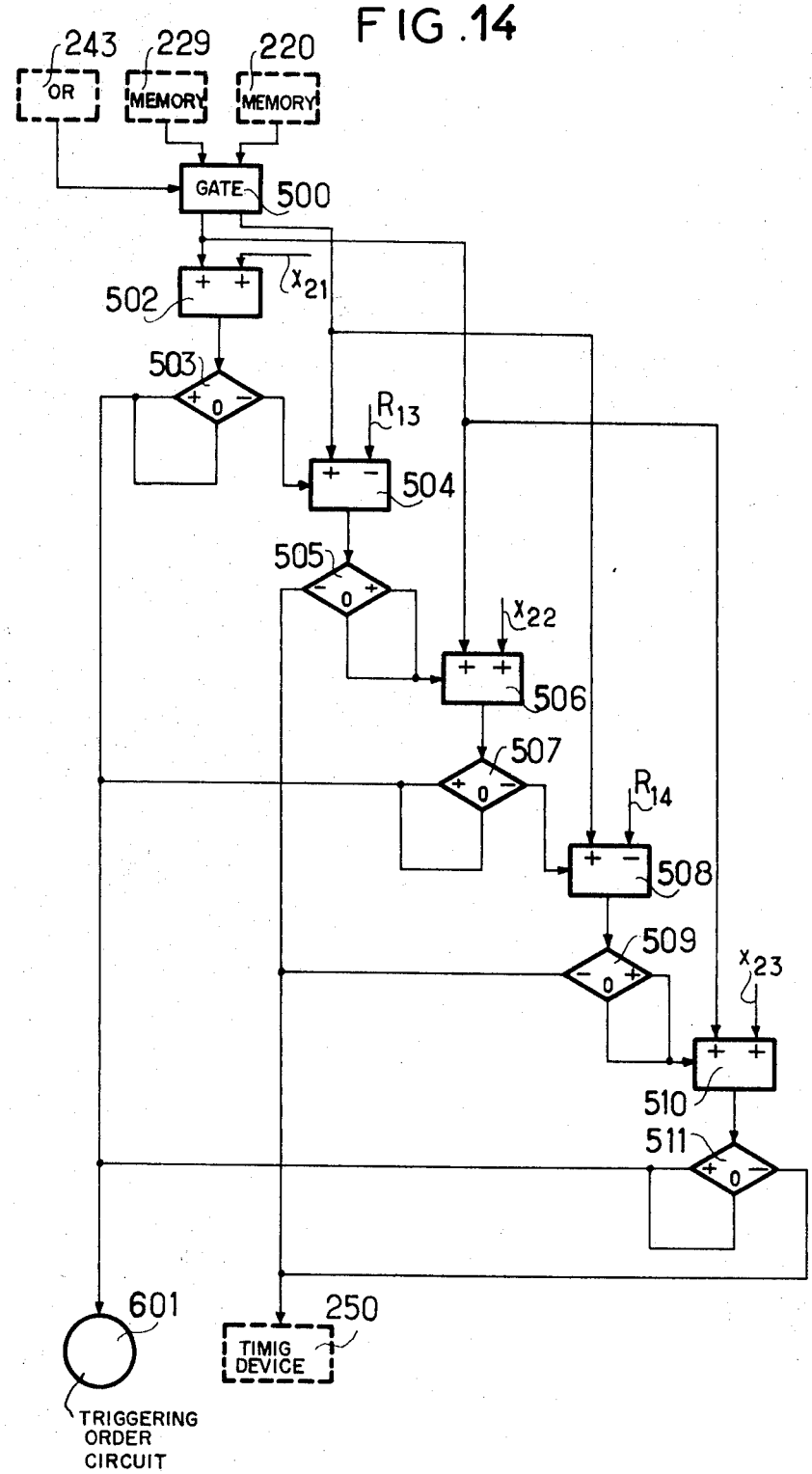

They are associated with the OR circuit 243 which authorizes the verification sequence relative to a possible downstream defect in zone I, shown in FIG. 14.

a4. AND circuit 240, which associates $Rd = 0$ and $x = 0$, activates a circuit 244 which performs a verification calculation, using auxiliary voltages to define the direction of the defect.

a5. The AND circuit 245, which associates $Rd < 0$ and $x > 0$, corresponds to a case where there is no defect. It acts upon circuit 250 to authorize the passage to a measurement on another loop.

The quadrant in which the point $(Rd, x)$ is situated has now been determined and we position this point with respect to the surveillance contour. This is done by the circuits shown in FIGS. 12, 13 and 14.

b1. The point is in the quadrant corresponding to $x < 0$ and $Rd < 0$ (verification sequence authorized by OR circuit 241). The circuit considered is the one in FIG. 12. The OR circuit 241 authorizes the opening of gate 300. Circuit 301 gives us the sum of $x + X20$ which is equivalent to $x - (-X20)$, the value X20 being the one defined on the diagram in FIG. 5. The sign comparator circuit 302 gives us the sign of $x + X20$:

if $x + X20 \geq 0$, there is a defect upstream, and a signalling and/or intervention device 600 is activated, if $x + X20 < 0$, there is no defect, and the timing circuit 250 is activated and permits passage to a measurement on another loop.

b2. The point is in the quadrant corresponding to $x > 0$ and $Rd > 0$ (verification sequence authorized by circuit OR 242). The circuit used is the one shown in FIG. 13. The OR circuit 242 authorizes the opening of the gate 400 which, at the input, receives the data $x$ and $Rd$, contained in memories 229 and 220.

The subtractor circuit 401 performs $x - X10$; the comparator 402 enables us to obtain the sign of $x - X10$;

if $x - X10 \leq 0$, circuit 403 performs $Rd - R11$, the comparator circuit 404 defines the sign $Rd - R11$;

if $Rd - R11 \leq 0$, there is a defect in zone I, the latter triggers a signalling and/or intervention member 601, if $Rd - R11 > 0$, there is no defect, the timing circuit 250 is activated and accomplishes the transition to a measurement on another loop;

if $x - X10 > 0$, circuit 405 performs $x - X11$; the comparison circuit 406 makes it possible to obtain the sign of $x - X11$, if $x - X11 \leq 0$, we perform $Rd - R12$ with circuit 407 and the comparator 408 defines the sign of $Rd - R12$, if $Rd - R12 \leq 0$, there is a defect in zone I and member 601 is activated, if $Rd - R12 > 0$, there is no defect and the timing circuit 250 accomplishes the transition to a measurement on another loop, if $X - X11 > 0$, circuit 409 performs $x - X12$; the comparator circuit 410 defines the sign of $x - X12$, if $x - X12 \leq 0$, there is a defect in zone I and member 601 is activated, if $x - X12 > 0$, we perform $x - X13$ with circuit 411; the comparator 412 gives us the sign of $x - X13$, if $x - X13 \leq 0$, there is a defect in zone II, which triggers a visualization and/or intervention member 602, if $x - X13 > 0$, we perform $x - X14$ with circuit 413; the comparator 414 gives the sign of $x - X14$, if $x - X14 \leq 0$, there is a defect in zone III, which triggers a visualization and/or intervention member 603, if $x - X14 > 0$, there is no defect, circuit 250 is activated and accomplishes the passage to a measurement on another loop.

b3. The point is in the quadrant corresponding to $Rd > 0$ and $x < 0$ (verification sequence authorized by OR circuit 243). The circuit considered is the one shown by FIG. 14. OR circuit 243 authorizes the opening of the double gate 500 which, at the input, receives the values $x$ and $Rd$ contained respectively in memories 229 and 220.

Circuit 502 performs $x + X21$, that is to say, $x - (-X21)$; the comparator 503 gives the sign of $x + X21$;

if $x + X21 \geq 0$, there is a defined in zone I (FIG. 5), which triggers the member 601 mentioned earlier, if $x + X21 < 0$, circuit 504 performs $Rd - R13$; the comparator 505 gives the sign of $Rd - R13$, if $Rd - R13 < 0$, there is no defect which activates circuit 250 which performs the passage to a measurement on another loop, if $Rd - R13 \geq 0$, we perform $x + X22 = x - (-X22)$ with circuit 506; the comparator 507 gives the sign of $x + X22$, if $x + X22 \geq 0$, there is a defect in zone I, which activates the member 601, if $x + X22 < 0$, we perform $Rd - R12$ with circuit 508; the comparator 509 gives the sign of $Rd - R14$, if $Rd - R14 < 0$, there is no defect, the circuit 250 performs the transition to a measurement on another loop, if $Rd - R14 \geq 0$, we perform $x + X23$ with the circuit 510; the comparator 511 gives the sign of $x + X23$, if $x + X23 \geq 0$, there is a defect in Zone I, and member 501 is activated, if $x + X23 < 0$, there is no defect, circuit 250 performs the transition to a measurement on another loop.

In case there is a defect, the members 600, 601, 602 and 603 give the instructions necessary for the triggering orders and then, through circuit 250, control the passage to the measurement on another loop.

In summary, after the comparisons that enable us to place the values $Rd$ and $x$ determined with respect to a surveillance contour, we act either upon a circuit 250 which permits a transition to a study of a new loop, or we act upon a triggering order issue member 600, 601, 602, or 603 when there is a defect.

These members work out a triggering order concerning, respectively, the so-called zones I (the nearest one downstream), II (downstream from zone I), III (downstream from zone II), and IV (the closest one, upstream).

Figure 15:
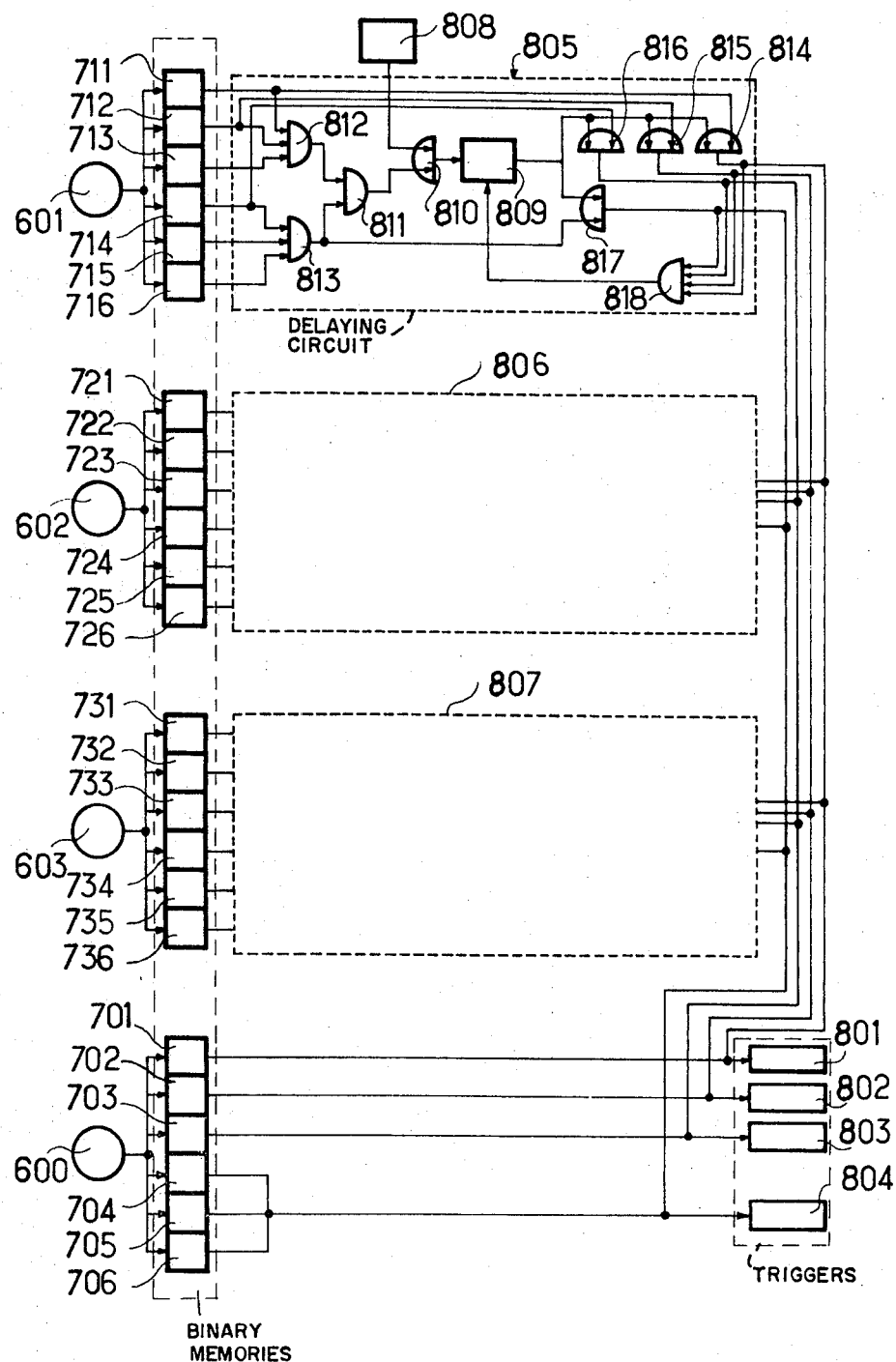
FIG. 15 is a schematic representation of the control means for the means for working out the triggering orders.

On the other hand, we must coordinate the action of these members, 600–603, with that of the switches, such as 56, 57 and 58 (FIG. 8). In effect, depending upon whether the verification concerns a phase-ground loop or a phase-phase loop, we have to act, respectively, on the phase considered or on the three phases (in the case of a three-phase line). The circuit that enables us to do that is shown in FIG. 15.

The signal emitted by member 600 in case of the appearance of a defect is transferred to the memory 701, 702, 703, 704, 705 or 706, respectively, if we are dealing with a defect relative to phase 1, to phase 2, to phase 3, to phases 1 and 2, to phases 1 and 3, or to phases 2 and 3.

The same is true for the members 601, 602 and 603. Memory 701 acts directly on circuit 801 which works out a triggering order leading to the cutting of phase 1 of the line considered; the same goes for memory 702 on circuit 802 which works out a triggering order leading to the cutoff of phase 2, and for memory 703 on circuit 803 which works out a triggering order leading to the cut off of phase 3. All three memories 704, 705, and 706 act upon the trigger 804 which cuts the three phases 1, 2, and 3.

When the defect detected is in zone II, III, or IV, we must introduce a delay between the signal coming out of member 601, 602 or 603 and the transmission of the triggering order from the phase or phases concerned. This delay is worked out by means of circuits 805, 806 and 807. These three circuits are identical and only one of them is described and illustrated in detail in FIG. 15. It involves mainly a clock 808 which controls a counter 809. The counter is triggered by means of the AND gate 810 and OR gates 811, 812, 813, when a signal appears on one of the memories 711–716 (or 721–726, or 731–736). At the end of an interval of time determined by the capacity of the counter 809 and the timing of clock 808, an interval of time which is relatively short, the counter 809 acts:

either on circuit 801 through AND circuit 814 when the defect signal comes from memory 711 (or 721, or 731);

or on circuit 802 through the AND circuit 815 when the defect signal comes from memory 712 (or 722, or 732);

or upon circuit 803 through the AND circuit 816 when the defect signal comes from the memory 713 (or 723, or 733);

or upon circuit 804 through the AND circuit 817 when the defect signal comes from one of memories 714, 715, 716 (or 724, 725, 726, or 734, 735, 736).

Counter 809 is reset to zero, by means of the OR circuit 818 through output signals from AND gates 814 to 817 or by a signal following the action of a triggering order elaboration circuit (case not illustrated). The counter is likewise reset to zero if a defect has disappeared either because it went away or because it was eliminated by other protection elements.

It should be noted that the time necessary for checking a loop is very short and on the order of 1.5–3 $\mu$ s. Since a three-phase lead-out determines six phase-ground or phase-phase loops, the verification of the latter requires about 9–18 $\mu$ s. It is thus possible to watch 16 three phase lead-outs (that is to say, 96 loops), with a single device in a period of time between 3 and 5 ms, in other words, less than a quarter of the period.

The preceding specifications, for the sake of simplicity, related to only one three phase lead-out; it should be noted that extension to any number of lead-outs is obvious. For this, it suffices to equip each line with an analog voltage detector and an analog current detector, followed by an analog circuit that works out a signal that will be representative of the voltage drop in the line per unit of length. These elements will be successively connected to the analog memories 23–31 (FIG. 7) by means of a switch controlled by a timing means.

The example given above is by no means restrictive and can, without going beyond the framework of the invention, replace any means by a similar means.

What is claimed is:

1. A method for the surveillance of a plurality of electrical lines defining a plurality of phase-ground and phase-phase loops in a multiphase distribution system, a defect in a loop of said lines being defined by its resistance $Rd$ and its distance $x$ from a measuring point, the values thereof being within a closed surveillance contour plotted in a plane with reference to a coordinates system $Rd$ and $x$, and determined by the characteristic of said lines and said multiphase distribution system, said method wherein all the loops are sequentially tested comprising for every loop tested the step of a. measuring at two different instants the instantaneous values of voltage and current available on the tested loop at the measuring point, b. computing on the basis of preceding measures the value of a resistance $Rd$ of a possible defect on said tested loop, c. comparing said value of resistance $Rd$ with two predetermined values bounding in the plane a surface including the closed surveillance contour, and testing the following loop if the computed value of $Rd$ is outside a range bounded by said two predetermined values, d. computing on the basis of the preceding measures the value of the distance $x$ of the possible defect on said tested loop, e. comparing the pair of computed values of the resistance $Rd$ and the distance $x$ with pairs of predetermined values to locate in the plane, the position of the pair of computed values of $Rd$ and $x$ with reference to the closed surveillance contour, and testing the following loop if said pair of computed values are outside the closed surveillance contour, f. and triggering a defect responsive device if said pair of computed values are located within the closed surveillance contour.

2. A surveillance device for determining defects and their locations in a plurality of electrical lines defining a plurality of phase-ground and phase-phase loops in a multiphase distribution system, a defect in a loop of said lines being defined by its resistance $Rd$ and its distance $x$ from a measuring point, the values thereof being within a closed surveillance contour plotted in a plane with reference to coordinates system $x$ and $Rd$, and determined by the characteristics of said lines and said multiphase distribution system, comprising:

a. input means which comprise:
   I. analog means for producing signals representative of the currents and voltages in said lines and signals representative of the inherent voltage drop per unit length in each of said lines;
   II. selective switching means for sequentially selecting the representative signals concerning every phase-phase or phase-ground loop; and b. computing means which comprise:
   I. means for computing, on the basis of said representative signals concerning the loop selected by the selective switching means, the value of the resistance $Rd$ of a possible defect in the concerned loop;
   II. first comparator means for comparing the computed value of $Rd$ with two predetermined values bounding in the plane, a surface including the closed surveillance contour;
   III. means responsive to said first comparator means for operating said selective switching means to select the following loop when the computed value of $Rd$ is outside of a range bounded by said predetermined values;
   IV. means responsive to said first comparator means for computing the value of the distance $x$ of the possible defect in the concerned loop on the basis of said representative signals selected by the selective switching means;
   V. second comparator means for comparing the pair of computed values of $x$ and $Rd$ with pairs of predetermined values to locate in the plane the pair of computed value of $x$ and $Rd$ with reference to the closed surveillance contour;
   VI. means responsive to said second comparator means for operating said selective switching means to select the following loop when the pair of computed values of $x$ and $Rd$ are outside said closed surveillance contour;
   VII. intervention means responsive to said second comparator means for disconnecting the lines forming the concerned loop when the pair of computed values of $x$ and $Rd$ are inside said closed surveillance contour.

3. The surveillance device of claim 2 wherein said input means further comprise:
   a. a plurality of analog voltage detectors and a plurality of analog current detectors associated with said electrical lines;
   b. a plurality of analog circuits connected to said analog current detectors for producing a signal representative of the inherent voltage drop per unit length in each of said electrical lines;
   c. a multiple switch closed for an extremely brief and perfectly synchronized time;
   d. a plurality of analog memories each connected by means of said multiple switch to a voltage detector, a current detector or an analog circuit;
   e. at least two groups of principal digital memories;
   f. double switches;
   g. analog digital converters each being connected by means of said double switches to at least one of said analog memories and to at least one of said principal digital memories, the double switches connected to principal digital memories belonging to a group being actuated simultaneously, the double switches connected to principal digital memories belonging to two distinct groups being actuated at two distinct moments;
   h. at least two groups of auxiliary digital memories coupled by said selecting switch means to said principal digital memories, said groups of auxiliary digital memories corresponding to the group of said principal digital memories, stocking representative signals concerning the loop selected by said selective switching means and being further connected to said computing means.

4. The surveillance device of claim 3, further comprising subtractor circuit means coupled between auxiliary memory and two principal digital memories.

5. The surveillance device of claim 2, wherein said intervention means comprises:
   a. a plurality of binary memories each corresponding to a phase-ground or phase-phase loop determined by said electrical lines and to a zone relative to a section of these lines as determined by said surveillance contour, each of said memories being activated in response to the detection of a defect in the zone and in the loop to which it corresponds, b. triggering order circuits coupled to said binary memories and activated in response to said binary memory which corresponds to a first zone and to a defect between two zones, and also through delay circuits to the binary memory which corresponds to a defect between two phases and in other zones.

6. The surveillance device as claimed in claim 5, wherein said delay circuits comprise logic gates and a binary counter, the capacity of said binary counter being a function of the delay which is to be introduced.

* * * * *